Oct. 12, 1948.    A. E. MEINZER    2,450,978
METHOD AND APPARATUS FOR PRODUCTION OF EXPANDED SLAG
Filed July 3, 1944    2 Sheets-Sheet 1
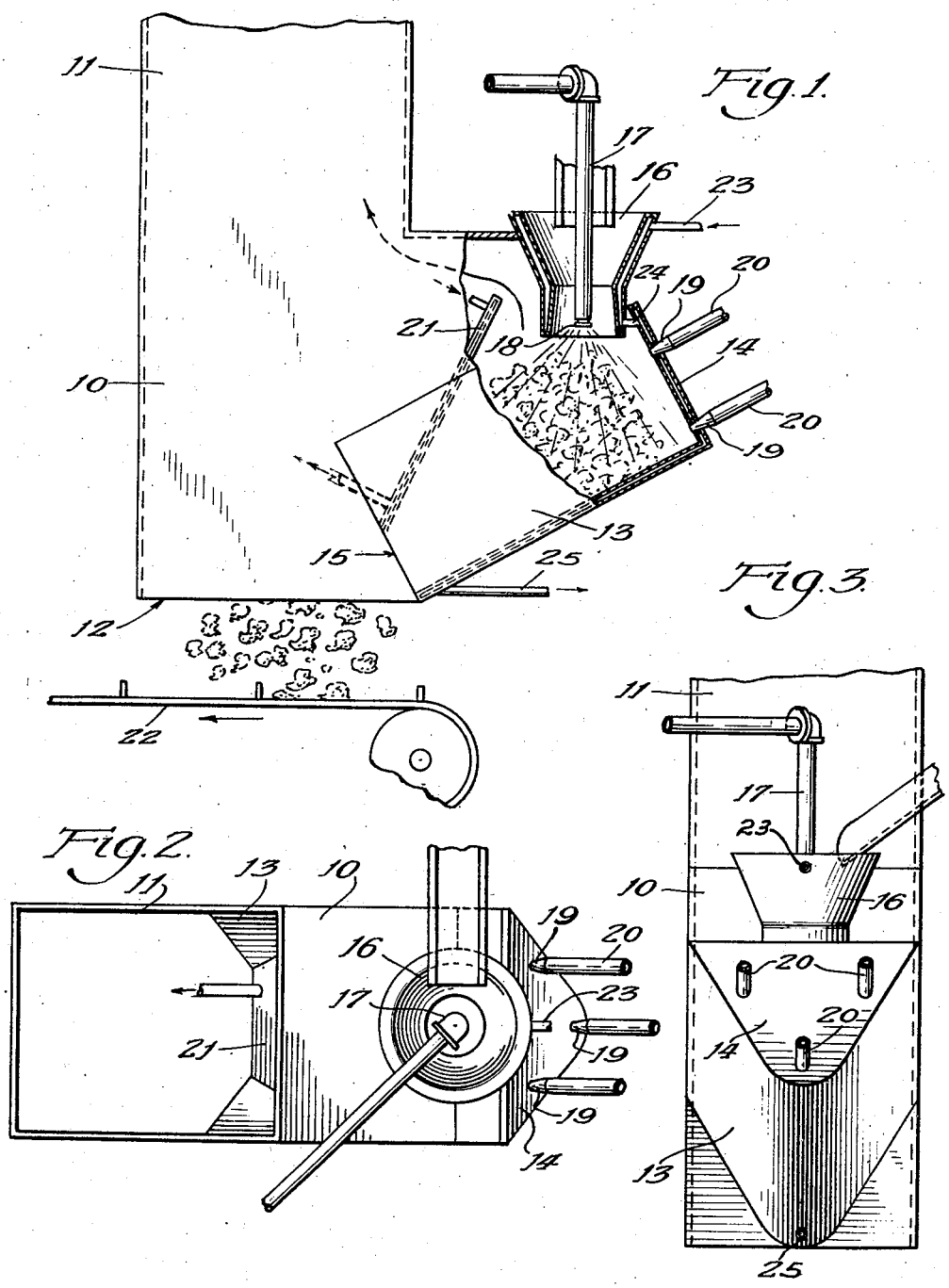
Inventor:
Arthur E. Meinzer
By: Lee J. Gary
Attorney Oct. 12, 1948.　　　　A. E. MEINZER　　　　2,450,978
METHOD AND APPARATUS FOR PRODUCTION OF EXPANDED SLAG
Filed July 3, 1944　　　　2 Sheets-Sheet 2
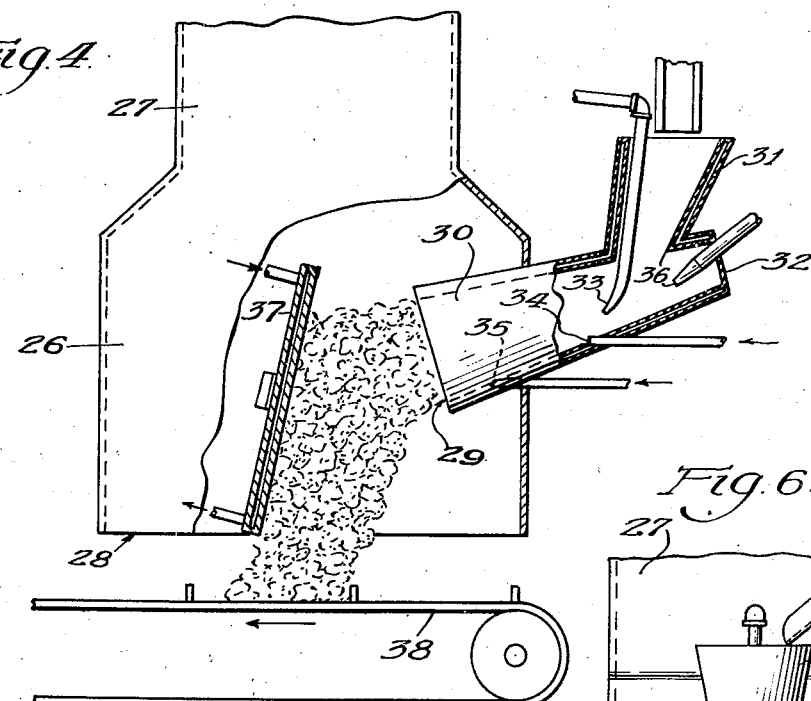
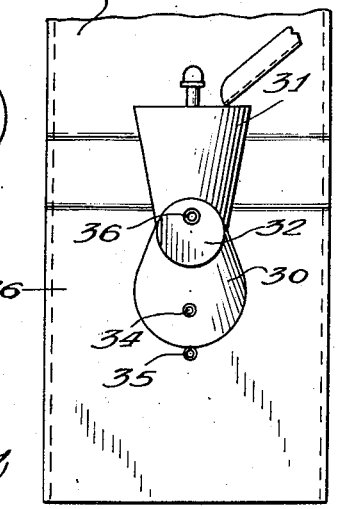
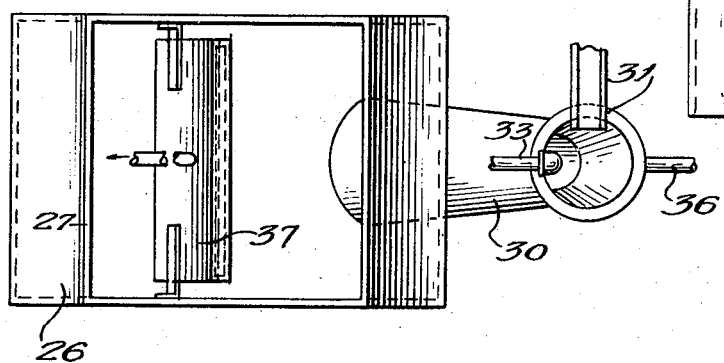
Inventor:
Arthur E. Meinzer
By: Lee J. Gary
Attorney Patented Oct. 12, 1948

2,450,978

UNITED STATES PATENT OFFICE 2,450,978

METHOD AND APPARATUS FOR PRODUCTION OF EXPANDED SLAG

Arthur E. Meinzer, Birmingham, Ala., assignor to Wallace L. Caldwell, Birmingham, Ala.; Leona Templeton Caldwell executrix of said Wallace L. Caldwell, deceased Application July 3, 1944, Serial No. 543,388

3 Claims. (Cl. 49—1)

1

This invention relates to a novel apparatus for the expansion and granulation of any molten slag-like material such as blast furnace slag, copper slag, lead slag, glass, boiler slag and the like, and to the method of producing with such apparatus an expanded slag of superior quality suitable for use as aggregate or as granulated slag to be pulverized and used as a constituent of hydraulic cements or a mineral filler.

Numerous methods are known for the production of expanded slags, and various specific types of apparatus have been employed for the expansion of slag by the addition of water, steam or air, or by mechanical means. Most of the known methods for the expansion of slag to be used as an aggregate or as a granulated slag produce a product of inferior mechanical strength or unsatisfactory durability. The main reasons for such deficiencies is that the methods of expansion which have been employed produce invariably an expanded slag of light weight with relatively large and irregularly sized and shaped pores and a marked lack of uniformity of structure.

It has been shown that in order to produce an expanded or granulated slag of light weight, of strong cell structure having fine and regularly sized pores, that some further step in the processing beyond the mere expansion is necessary. The contact of molten slag with water or steam produces some sort of expanded slag regardless of the method employed. Usually in those cases where a very small amount of water is used, the product is a so-called "popcorn" slag which is formed in relatively large lumps and, conversely, when excessively large amounts of water are used the slag is a so-called granulated slag which consists of small pellets or grains.

It is an object of the present invention to provide a method and apparatus whereby the expanded slag is further processed, before cooling, so as to form an expanded slag which will provide an aggregate or granulated slag of exceptional quality. The process and apparatus as described herein will produce amalgamated enlarged particle masses or irregular lumps of enhanced strength and toughness and a refined more uniform cell structure, suitable for use as such as a high grade aggregate, or for pulverization for the purposes previously described.

In general my invention relates to the production of agglomerated particle masses of lightweight cellular aggregate from molten slag by disintegrating molten slag in suitable slag expansion and granulation means, under controlled conditions regulated to form particles or pellets

2 of hot plastic cellular slag, and impelling the resultant pellets in a stream at a high velocity from the disintegrating means into a contiguous discharge chamber open to the heat of and forming a discharge path for both the gaseous and solid reaction products of the disintegrating means, and causing the high velocity particle stream to impinge upon and become deflected by means of a baffle positioned intermediate the discharge chamber, so as to cause the particles while in such hot plastic condition to amalgamate and weld by impact, prior to discharge to a cooling atmosphere, into the form of relatively enlarged cellular particles or particle masses. These enlarged masses are thereafter permitted to gradually cool and anneal themselves by their contained heat to result in an expanded slag of superior quality and strength which may be used as an aggregate or which may thereafter be pulverized to provide a substantially moisture free material which may be used as a constituent of hydraulic cement or for other purposes such as a mineral filler.

My invention will be further explained in connection with the accompanying drawings which more or less diagrammatically illustrate several arrangements of apparatus suitable for carrying out the method thereof.

Fig. 1 is a fragmentary side elevation, with parts broken away and in section, of an arrangement of apparatus for carrying out the process of my invention.

Fig. 2 is a plan view of the apparatus illustrated in Fig. 1, and,

Fig. 3 is a fragmentary end elevation thereof.

Fig. 4 is a fragmentary side elevation, with parts broken away and in section, illustrating a modified arrangement of apparatus for carrying out the method of my invention.

Fig. 5 is a plan view of the apparatus illustrated in Fig. 4.

Fig. 6 is a fragmentary end elevation thereof.

Referring to the drawings, the form of apparatus illustrated in Figs. 1 to 3, comprises a molten slag disintegration product discharge chamber generally designated as 10, open at the top of the gaseous products discharge vent 11 for the discharge of the large volume of steam formed or other gases emanated in the process, and which may lead to a suitable exhaust fan, not illustrated. The base of the chamber 10 is open as at 12 to permit discharge therethrough of the particle product formed in the process. Extending laterally of and projecting into the discharge chamber 10 is the slag expansion and granulation receptacle 13 in the form of a trough closed at its outer end 14 and open at its inner end 15 within the confines of the discharge chamber 10. The receptacle 13 is inclined to the horizontal in a direction downwardly towards the open discharge base 12 of the chamber 10.

Positioned above and opening to the trough 13 adjacent its end 14 is the slag introduction funnel 16. Molten slag is introduced into the funnel 16 by means of a suitable runner, and the slag is discharged therefrom within the trough 13 in the form of an annular or ring shaped stream of molten slag. Extending axially of the funnel 16 is the water conduit 17 terminating in a nozzle 18 which preferably opens adjacent to the lower terminus of the funnel.

The nozzle 18 is constructed and arranged so as to discharge a conical jet of water under pressure, and preferably at a constant velocity, at a downward angle to the stream of slag as it issues from the funnel 16, to reduce the coherency of the slag stream and to cause expansion and granulation of the slag within the trough or receptacle 13 defining the expansion zone. The volume of water introduced from nozzle 18 is correlated to the volume of slag introduced from the funnel 16 and in a limited amount so as to permit expansion and granulation of the slag without an excess of water and to produce a product within the receptacle 13 which is in the form of hot plastic pellets of cellular slag.

Extending through the wall 14 at the inclined upper end of the trough 13 and opening within the trough are a plurality of nozzles 19 extending from respective conduits 20, three of such nozzles being shown in the illustration. These nozzles are adapted to emit high pressure jets of gaseous fluid such as air or steam, in a direction parallel to the trough 13 so as to impel the plastic pellets of cellular slag while still at a low red heat from the trough in a relatively confined stream at a high velocity, and in an inclined transverse direction of the chamber 10. The large volume of steam and other gases resulting from the disintegration also pass through the chamber 10 and outwardly therefrom through the vent section 11 and it will thus be apparent that the atmosphere within the chamber 10 is in a highly heated condition during the operation of the process.

Interposed within the chamber 10 and in juxtaposition to the trough 13 is the generally vertically extending but inclined baffle 21, the baffle being inclined at an obtuse angle to the trough 13 and the path of high velocity particle discharge therefrom. Thus as the hot plastic particles are impelled from the receptacle 13 by means of high velocity jets issuing from the nozzles 19, the stream of particles are caused to impinge against the surface of the baffle 21 and to be downwardly deflected therefrom for discharge through the open base of the chamber 10. Due to the high velocity of the particles and their impact against the baffle 21 while in such heated condition, and against the cold surface of baffle 21, the movement of the particles is momentarily arrested and groups of particles are caused to amalgamate together by impact and to weld together into somewhat larger particles before being discharged from chamber 10. These relatively enlarged particles as a result of their compaction by the aforesaid impact are caused thereby to become of somewhat densified nature and of a more uniform and refined cell structure and they thereafter drop through the chamber 10 and are collected on the moving conveyor belt 22 positioned therebelow and carried to cars or to storage in bins where the relatively enlarged particle masses are permitted to gradually cool in the atmosphere and to anneal themselves by their contained heat. The resulting particle material is substantially moisture free as a result of the limited and controlled amount of water employed in the expansion and granulation step and the particles on cooling are of a toughened nature. If desired these particles may be pulverized for use as a constituent of hydraulic cements or as a mineral filler of tough and refined cell structure.

The walls of the funnel 16 and the trough 13 may be water jacketed as indicated, and cooling water introduced to the funnel 16 from the line 23, circulated from the funnel to the trough 13 through the line 24, and discharged from the trough 13 through the line 25. In a similar manner, baffle 21 may be water jacketed so as to enable it to be cooled to the extent necessary to permit the agglomerated particles to fall free and not to adhere to the surface of the baffle. It will be understood, however, that such indicated water jacketing is not for the purpose of controlling the temperature of the slag or expanded cellular particles, but rather solely for cooling the steel of which these sections are constructed to prevent their destruction to the necessary extent resulting from contact with the hot plastic.

The form of construction illustrated in the Figs. 4 to 6 comprises a discharge chamber generally indicated as 26 having an upwardly opening steam and other gas discharge vent 27, the chamber being open at its bottom 28. Extending laterally of and projecting into and opening at one end 29 within the chamber 26, is the inclined conical receptacle 30 defining a slag expansion and granulation zone. An inverted conical funnel 31 intersects and opens within the receptacle 30 adjacent its upper and outwardly extending closed end 32. Molten slag is introduced by means of a suitable runner into funnel 31 and as the slag descends into the inclined receptacle 30, it is reduced to a non-coherent state by streams of water impinged against it under high pressure issuing from a pair of nozzles, one nozzle 33 being positioned so as to impinge a stream of water in the center of the slag stream as it issues from the funnel 31 to the receptacle 30, and the other nozzle 34 being positioned so as to impinge a jet of water at the bottom of the slag stream. The violent reaction of hot molten slag and water serves to expand and granulate the slag within the receptacle 30. The volume of water introduced through nozzles 33 and 34 is correlated to the volume of slag introduced through the funnel 31 and controlled so as to allow expansion and granulation of the slag without an excess of water but rather to result in the formation of hot plastic pellets of cellular slag.

Extending into and opening within the disintegration zone of receptacle 30 are a pair of nozzles 35 and 36 adapted to emit high pressure jets of steam or air to eject the plastic cellular particles from the receptacle 30 while still in a red hot condition in a generally transverse but downwardly inclined direction within the discharge chamber 26. Positioned within the discharge chamber 26 and under the influence of the heated materials emitted from the receptacle 30, that is the large volume of steam, heated air, product gases and the expanded hot slag particles, is the generally vertically extending but inclined baffle 37, the baffle being inclined at an obtuse angle to the longitudinal axis of the receptacle 30 and the high velocity particle stream issuing therefrom under impulsion from the jets emitted from the nozzles 35 and 36.

Thus in a manner similar to that described with respect to the arrangement of apparatus of Figs. 1 to 3, as the hot plastic particles are impelled from the receptacle 30 by means of the high velocity jets issuing from the nozzles 35 and 36, the streams of particles are caused to impinge against the surface of the inclined baffle 37 and to be downwardly deflected therefrom for discharge through the open base of chamber 26. Due to the high velocity of the particles and their impact against the baffle 37 while in such heated condition, and against the cold surface of baffle 37, the movement of the particles is momentarily arrested whereby groups of particles are caused to become agglomerated or amalgamated together by impact and to weld together into somewhat larger particles before discharge through the open base 28 of chamber 26. These relatively enlarged particles, as a result of the compaction by impact, are caused to thereby become somewhat densified and of a more uniform refined cell structure. As they drop through the open base 28, they are collected on the moving conveyor belt 38 positioned therebelow and carried to cars or storage bins where the relatively enlarged particle masses are permitted to cool in the atmosphere and anneal themselves by their contained heat to provide a toughened structure. Thereafter upon cooling the particle masses may be used as high grade aggregate or may be pulverized for use as a substantially moisture-free constituent of hydraulic cements or as a mineral filler.

As illustrated in Fig. 4 the walls of the conical funnel 31 and receptacle 30 may be water jacketed and cooling water circulated therethrough for cooling the steel of which these sections are constructed to prevent their destruction in contact with the hot slag, and that additionally baffle 37 may be similarly water jacketed, for like reasons and for the purpose of permitting the agglomerated particles to fall free and not adhere to the surface of the baffle, but not for the purpose of controlling the temperature of the slag or the expanded disintegration product thereof prior to discharge to the atmosphere.

It will be understood that the foregoing that various details, parts and arrangements thereof may be modified without departing from the spirit of my invention, I therefore do not wish to be limited thereto except as restricted by the following claims.

I claim as my invention:

1. Apparatus for producing agglomerated particle masses of light weight cellular slag aggregate from molten slag comprising a vertically extending chamber defining an upwardly opening path for discharge of gaseous products and a downwardly opening path for discharge of solid products, a horizontally inclined receptacle defining a slag expansion and granulation zone projecting into and the lower discharge end opening within said chamber, means adjacent the upper end of said receptacle for introducing a stream of molten slag and for impinging water against said slag stream in limited amount to reduce it to hot plastic pellets of cellular slag, nozzle means opening within said receptacle for impelling said slag particles therefrom in a stream by means of high velocity jets of gaseous fluid, and a vertically extending baffle within said chamber adjacent the discharge end of said receptacle and inclined thereto to deflect the flight of the plastic pellets, and to cause them to become amalgamated and welded together by impact into the form of relatively enlarged particle masses, and to be thereafter downwardly and externally discharged.

2. A method for producing agglomerated particle masses of light weight cellular slag aggregate from molten slag which comprises, impinging limited amounts of water against a downwardly descending stream of molten slags to reduce it to the form of hot plastic pellets of cellular slag, collecting said pellets by gravity in a downwardly inclined confined path and impelling them along said path by means of jets of gaseous fluid issuing at a high velocity and in a direction substantially parallel to said inclined path through a heated discharge zone and against a deflecting surface positioned intermediate the confines of said heated zone to temporarily arrest the flight of the particles therethrough and to thereby cause said particles while in said hot plastic condition to become compacted and welded together into the form of relatively enlarged masses, and thereafter collecting therefrom and gradually cooling said masses.

3. Apparatus for producing cellular slag particles from molten slag comprising a vertically extending chamber defining an upwardly opening path for discharge of gaseous products and a downwardly opening path for discharge of solid particle products, a receptacle defining a slag expansion and granulation zone and a downwardly inclined discharge path for resulting cellular slag particles extending laterally of and opening endwise and within said chamber for discharge therein, means adjacent the opposed end of said receptacle for introducing a stream of molten slag and for impinging water against said slag stream in limited amount to reduce it to a non-coherent state, nozzle means opening within said receptacle for impelling resulting disintegrated cellular slag particles therefrom by means of high velocity jets of gaseous fluid in a stream transversely of said chamber, and a vertically inclined baffle positioned within said chamber and extending transversely of and in juxtaposition to the discharge end of said receptacle and in the path of high velocity particle discharge therefrom whereby to deflect the flight of the particles and to cause them to become amalgamated and welded together by impact, while still in a hot plastic condition into the form of relatively enlarged particles, and to be thereafter downwardly and externally discharged.

ARTHUR E. MEINZER.

REFERENCES CITED

The following references are of record in the file of this patent:

UNITED STATES PATENTS

| Number | Name | Date |
|---|---|---|
| 980,606 | Colloseus | Jan. 3, 1911 |
| 1,051,844 | Passow | Jan. 28, 1913 |
| 1,404,142 | Riedel | Jan. 17, 1922 |
| 1,502,793 | Maguet | July 29, 1924 |
| 1,699,575 | Spies | Jan. 22, 1929 |
| 2,210,999 | Bartholomew | Aug. 13, 1940 |
| 2,236,691 | Meinzer | Apr. 1, 1941 |

FOREIGN PATENTS

| Number | Country | Date |
|---|---|---|
| 227,848 | Great Britain | Dec. 31, 1925 |
| 457,707 | Great Britain | Dec. 3, 1936 |